(12) United States Patent
Koch et al.

(10) Patent No.: US 9,759,296 B2
(45) Date of Patent: Sep. 12, 2017

(54) LINEAR ACTUATOR AND METHOD FOR PRODUCING A LINEAR ACTUATOR

(71) Applicant: LOGICDATA Electronic & Software Entwicklungs GmbH, Deutschlandsberg (AT)

(72) Inventors: Walter Koch, Schwanberg (AT); Daniel Kollreider, Graz (AT); Branko Vukota, Falköping (SE); Marko Gracner, Maribor (SI)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 0 days.

(21) Appl. No.: 13/941,393

(22) Filed: Jul. 12, 2013

(65) Prior Publication Data

US 2014/0020488 A1 Jan. 23, 2014

(30) Foreign Application Priority Data

Jul. 13, 2012 (DE) .......................... 10 2012 013 979

(51) Int. Cl.
*F16H 25/12* (2006.01)
*A47B 9/04* (2006.01)
(Continued)

(52) U.S. Cl.
CPC .............. *F16H 25/12* (2013.01); *A47B 9/04* (2013.01); *F16B 21/186* (2013.01);
(Continued)

(58) Field of Classification Search
CPC ...... F16H 25/00; F16H 25/24; F16H 25/2015; F16H 25/2056; H02K 7/06
(Continued)

(56) References Cited

U.S. PATENT DOCUMENTS 5,704,249 A * 1/1998 Krauska ............... A47C 20/042
403/366
6,227,708 B1 * 5/2001 Rixen .................... B23Q 1/017
384/45
(Continued)

FOREIGN PATENT DOCUMENTS

DE 9209494 U1 * 2/1993 .............. E05F 11/34
DE 10065247 A1 7/2002
(Continued)

OTHER PUBLICATIONS

Machine translation of DE 9209494.*
"DB14/DL14 system," Deskline Improving Ergonomics User Manual, May 25, 2011, pp. 1-28, Linak, Nordborg.

*Primary Examiner* — William C Joyce
*Assistant Examiner* — Randell J Krug
(74) *Attorney, Agent, or Firm* — McDermott Will & Emery LLP

(57) ABSTRACT

A linear actuator comprising a spindle-based linear drive (1) having an inner threaded spindle (5) and an outer element (2) surrounding the threaded spindle (5), in which the threaded spindle (5) can be moved in the axial direction; and a telescopic housing (20) with a first telescope part (21) and a second telescope part (22), which is surrounded at least in part by the first telescope part (21). On its side facing the first telescope part (21), the second telescope part (22) has an adapter part (24) that is connected rotationally fixedly to the second telescope part (22) and has a central opening. The linear drive has a connecting element (30) that is mounted on the outer element (2) and comprises snap elements (31) that are engaged with the central opening of the adapter part (24) in such a manner that the connecting element (30) is held in the adapter part (24).

16 Claims, 6 Drawing Sheets

(51) Int. Cl.
*F16H 25/20* (2006.01)
*F16B 21/18* (2006.01)
*F16B 37/04* (2006.01)
*F16B 7/18* (2006.01)

(52) U.S. Cl.
CPC ....... *F16B 37/043* (2013.01); *F16H 25/2056* (2013.01); *A47B 2200/0056* (2013.01); *F16B 7/182* (2013.01); *F16H 2025/2037* (2013.01); *F16H 2025/2075* (2013.01); *Y10T 29/49826* (2015.01); *Y10T 29/49947* (2015.01); *Y10T 74/18672* (2015.01)

(58) Field of Classification Search
USPC ............ 74/89.23, 89.32–89.37, 424–424.81; 403/326, 329
See application file for complete search history.

(56) References Cited

U.S. PATENT DOCUMENTS

| | | | | |
|---|---|---|---|---|
| 6,880,416 | B2* | 4/2005 | Koch | A47B 9/04 74/424.72 |
| 7,832,053 | B1* | 11/2010 | Luksich et al. | 16/285 |
| 2003/0099419 | A1* | 5/2003 | Vignotto | F16C 19/184 384/539 |
| 2006/0145036 | A1* | 7/2006 | Jones | A47B 9/00 248/188.5 |
| 2006/0279143 | A1* | 12/2006 | Platz | A47B 9/04 310/51 |
| 2009/0016814 | A1* | 1/2009 | Cheng | F16H 25/20 403/294 |
| 2010/0018334 | A1* | 1/2010 | Lessing | 74/89.35 |
| 2010/0192715 | A1* | 8/2010 | Vauchel | F02K 1/763 74/89.35 |
| 2011/0061570 | A1* | 3/2011 | Klinke | A47B 9/20 108/20 |
| 2011/0061574 | A1* | 3/2011 | Klinke | A47B 9/04 108/147.19 |
| 2012/0011728 | A1* | 1/2012 | Keers | 30/164 |
| 2013/0015300 | A1* | 1/2013 | Klinke | A61G 7/018 248/49 |

FOREIGN PATENT DOCUMENTS

| | | | | |
|---|---|---|---|---|
| DE | 20108882 U1 | 10/2002 | | |
| DE | 202011103745 U1 | 1/2012 | | |
| DK | WO 2013159775 A1 * | 10/2013 | | A47B 9/04 |
| EP | 2301382 A1 | 3/2011 | | |

* cited by examiner

LINEAR ACTUATOR AND METHOD FOR PRODUCING A LINEAR ACTUATOR

TECHNICAL FIELD

The invention relates to a linear actuator, designed for height adjustment of a table for example, and to a method for producing such a linear actuator.

BACKGROUND

Linear actuators are usually used for displacing two movable parts relative to one another. For example, linear actuators are used in height-adjustable tables for raising or lowering a table top on a frame of a table. In various designs, a linear actuator has a telescoping housing and a spindle-based linear drive, by means of which a force action in the longitudinal direction is achieved.

One problem to be solved is to specify an improved concept for a linear actuator, which allows a simplified assembly of the linear actuator.

SUMMARY

This problem is solved with the subject matter of the independent claims. Configurations and refinements of the invention are the subject matter of the dependent claims.

The proposed concept is based on the idea of producing a connection between the linear drive and at least one telescope part of a telescopic housing by means of a snap connection. For this purpose, a special adapter part, through which the spindle-based linear drive projects, is provided in a telescope part. A connecting element with snap elements that can produce a fixed connection with the adapter part is additionally provided on the linear drive. This has the effect that no tools are needed for installation of the linear drive, in particular for introduction of the linear drive into the telescopic housing. This is particularly advantageous because access with tools is difficult in the tight spatial arrangement of a telescopic housing. Moreover, the snap connection makes it unnecessary to see the parts to be connected, which reduces the production expense in terms of both material and personnel.

In one embodiment, a linear actuator comprises a spindle-based linear drive that has an inner threaded spindle and an outer element surrounding the threaded spindle. The threaded spindle can be moved axially or longitudinally in the outer element. The linear actuator further comprises a telescopic housing with at least one first telescope part and at least one second telescope part, which is surrounded at least in part by the first telescope part. On its side facing the first telescope part, the second telescope part has an adapter part that is connected rotationally fixedly to the second telescope part and has a central opening. The linear drive has a connecting element that is fixed to the outer element and comprises snap elements engaged with the central opening of the adapter part in such a manner that the connecting element is held in the adapter part.

The snap elements are preferably designed so as to allow passage of the connecting element through the central opening of the adapter part in one direction and to prevent it in the opposite direction. It is accordingly easily possible to guide the connecting element with the snap elements through the central opening of the adapter part in one direction, in particular until the snap elements enter into an interlocking connection with the adapter part. A rearward movement, i.e. a detachment of the connecting element and thus the linear drive from the adapter part, accordingly prevented.

The connection of the outer element to the second telescope part is designed, for example, in such a manner that the outer element is seated rotatably and stationarily in the adapter part. Stationary in this context is understood to mean that no longitudinal displacement in the axial direction of the linear drive is possible.

In one embodiment, the adapter part is arranged in the second telescope part, in particular in the interior of the second telescope part, via at least two pins introduced from the outside. Accordingly, a stationary and rotationally fixed connection of the adapter part to the second telescope part is achieved.

In different embodiments, the non-rotatability of the adapter part in the telescope part can be provided by the cross-sectional shape of the adapter part or the second telescope part, especially if this cross section is not a circular shape. The pins can be constructed with or without threads. In an embodiment without threads, the pins can be introduced particularly easily into corresponding holes or recesses of the adapter part. The connection can be unsecured or can use a connecting means such as an adhesive. Because the second telescope part is surrounded by the first telescope part in the assembled state of the telescopic housing, the securing of the pins in the second telescope part or the adapter part can also be achieved by the surrounding first telescope part.

For example, the pins on the outer side of the second telescope part have a head that is in contact with the inner side of the first telescope part. The head can be formed from plastic, for example, can have a plastic component or can be covered by plastic. The plastic part enables simplified sliding between the first and second telescope parts. In conventional telescope parts, sliding elements that space the telescope parts away from one another and allow a pushing motion with low friction are inserted between the telescope parts, for example. The pins, in particular with a head made of plastic, can thus simultaneously replace the conventional sliding elements.

In one embodiment, the connecting element is formed from an elastically deformable plastic. For example, the connecting element may be constructed integrally, so that the snap elements can be guided through the central opening by the deformation of the connecting element. The snap elements may be resiliently mounted on the connecting element, for example. The resilient mounting can also be achieved with a multi-part connecting element by providing additional resilient parts, however.

In different embodiments, the first telescope part has, on the side facing away from the second telescope part, a base plate in which the threaded spindle is mounted rotationally fixedly and stationarily. Accordingly, only the outer element inside the telescope housing rotates during movement of the linear drive, while the threaded spindle remains fixed.

The proposed concept has so far been described for a two-part telescope extension with a two-part telescope housing and a two-part linear drive. The described concept can also be applied to multi-part linear actuators, however.

For example, the telescope housing has a third telescope part which is at least partially surrounded within the second telescope part. The linear drive is designed in at least three parts and has a fixed drive unit housing that is connected rotationally fixedly and stationarily to the third telescope part. The second telescope part, to which the outer element of the linear drive is connected, thus represents the center telescope part in a three-part telescope extension.

For example, the linear drive may comprise the drive unit housing with a drive unit therein as well as an internally hollow drive shaft driven by the drive unit. A profile tube, which constitutes the external element, is mounted rotationally fixedly and displaceable longitudinally on the drive shaft. The linear drive further comprises a threaded hollow spindle with an outside thread that is arranged between the drive shaft and the profile tube and is fixedly connected to the drive unit housing. A hollow spindle nut is fixedly connected to the profile tube at a first end of the profile tube and cooperates with the outside thread of the threaded hollow spindle. A spindle nut is fixedly connected to the profile tube at a second end of the profile tube. The threaded hollow spindle is arranged in the interior of the drive shaft and cooperates with a thread of the spindle nut.

The outside thread of the threaded hollow spindle and the thread of the threaded spindle preferably have different directions. For example, the hollow spindle nut may be arranged at the end of the profile tube facing the drive unit housing, while the spindle nut is arranged at the end of the profile tube facing away from the drive unit housing.

In case of a rotation of the drive shaft, the profile tube, which extends on the outside around the other elements, turns, due to its rotationally fixed seating, along with the drive shaft. By means of its rotation on the threaded hollow spindle, the hollow spindle nut, which is in turn connected to the profile tube, brings about a longitudinal movement of the profile tube on the drive shaft. This is enabled by the longitudinally movable seating of the profile tube or the external element on the drive shaft. The same linear movement of the linear drive is achieved by a longitudinal displacement between profile tube and drive shaft.

For example, the spindle nut and the connecting element may be constructed as a common component. In particular, it is possible for the spindle nut to be constructed as a plastic component which, in addition to its function as a spindle nut, contains the snap elements that are arranged in the profile tube on the side facing the threaded spindle. This further simplifies the later assembly of the linear drive in the telescopic housing. The threaded spindle is fixedly connected to the telescope part with the relatively large radius.

In alternative embodiments, the threaded spindle can also be connected to the telescope part that is farthest inside or has the smallest radius. In this case, the connecting element is arranged on the side of the profile tube facing the threaded spindle. In particular, the connecting element in this case is designed such that the threaded hollow spindle can rotate unhindered inside the connecting element relative to the profile tube or the outer element.

In different embodiments, the second telescope part with the adapter part is formed in at least two parts. For example, the adapter part is introduced during assembly of the telescopic housing as a separate part in the second telescope and fixed in place there, for example with pins as described above. The spindle nut may be stamped together with the profile tube, for example.

In other embodiments, the second telescope part is integrally formed with the adapter part. Thereby the assembly expense can be further reduced.

One embodiment of a height-adjustable table comprises at least one linear actuator according to one of the described embodiments, preferably however, two or more such linear actuators.

The proposed concept brings the advantage that a finished linear drive can be installed simply and reliably in the likewise finally assembled telescopic housing. In particular, the telescopic housing can be completely assembled and adjusted independently of the linear drive using a suitable adapter part, for example. Adjustment in this case relates to the provision of the above-described sliding elements, for example. Installing the linear drive does not require any additional tools; instead, the linear drive is simply introduced into the telescopic housing and pressed into the adapter part and axially secured. The telescopic housing accordingly need not be disassembled during the installation of the linear drive, in contrast to conventional solutions.

In one embodiment of a method for producing a linear actuator, a telescopic housing is provided with a first telescope part and a second telescope part that is at least partially surrounded by the first telescope part. A spindle-based linear drive that has an internal threaded spindle and an outer element surrounding the threaded spindle in which the threaded spindle can be moved in the axial direction is provided as a spindle-based linear drive. An adapter part that has a central opening is mounted in the second telescope part on the side facing the first telescope part in such a manner that the adapter part is rotationally fixedly connected to the second telescope part. A connecting element comprising snap elements is additionally mounted on the outer element of the linear drive. The linear drive with the mounted connecting element is introduced into the second telescope part from the side facing away from the first telescope part, the connecting element being guided through the central opening of the adapter part in such a manner that the snap elements are engaged with the central opening of the adapter part and the connecting element is held in the adapter part.

For example, the adapter part is connected to the second telescope part via at least two pins introduced from outside.

The method can further comprise providing the first telescope part with a base plate mounted on the side facing away from the second telescope part. The threaded spindle is connected rotationally fixedly and stationarily to the base plate.

Further configurations of the method follow directly from the previously described embodiments of the linear actuator.

The embodiments of the method are also characterized in that an assembly of the linear actuator, in particular the Mining of the linear actuator with the telescopic housing, can be done without tools.

BRIEF DESCRIPTION OF THE DRAWINGS

The invention will be described in detail below for several embodiment examples with reference to figures. Identical reference numbers designate elements or components with identical functions. Insofar as elements or components correspond to one another in function, a description thereof will not be repeated in each of the following figures.

Therein.

DETAILED DESCRIPTION

Figure 1:
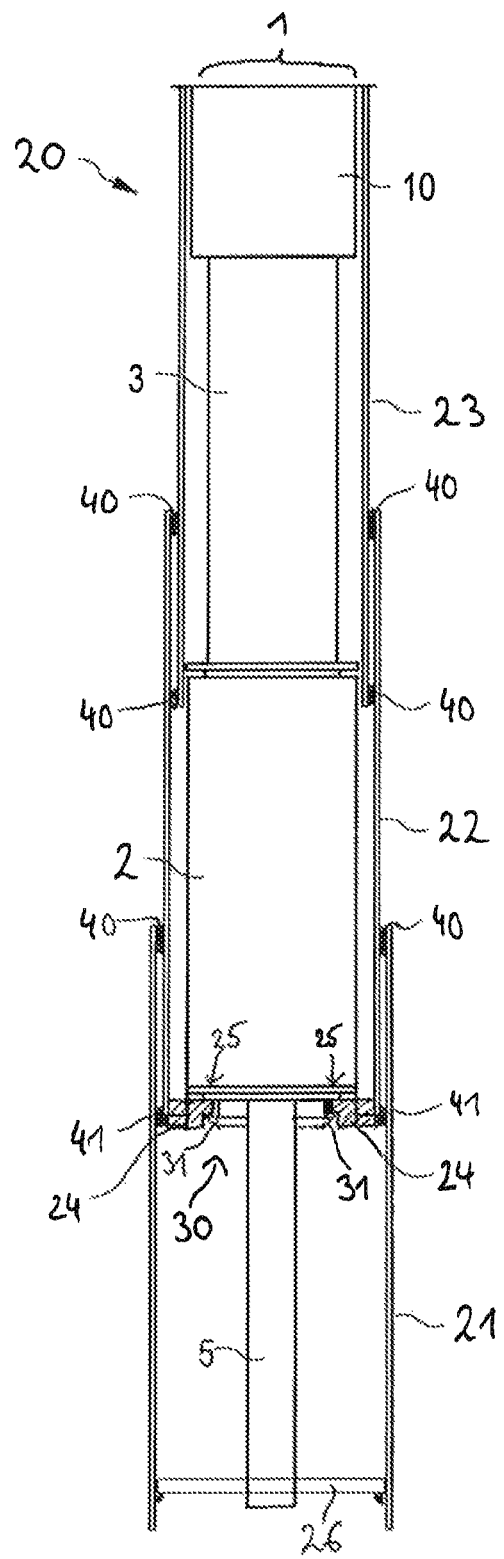
FIG. 1 shows one embodiment of a linear actuator.

FIG. 1 shows one embodiment of a linear actuator with a spindle-based linear drive 1 arranged in a telescopic housing 20. The telescopic housing 20 in this embodiment has three telescope parts 21, 22, 23 that can be moved one inside another. Sliding elements 40, 41, which enable a displacement of the telescopic parts 21, 22, 23 relative to one another with low friction, are respectively provided between the telescope parts 21, 22 and 22, 23.

The linear drive 1 comprises a profile tube 2, a threaded hollow spindle 3 and a threaded spindle 5 which is designed to be longitudinally movable inside the profile tube 2 and the threaded hollow spindle 3. The linear actuator 1 further comprises a drive unit housing 10 with a drive unit arranged therein that drives the threaded hollow spindle level 3.

At its lower end, which is facing away from the second telescope part 22, the first telescope part 21 comprises a base plate 26 in which the threaded spindle 5 is connected rotationally fixedly and stationarily. For example, the drive unit housing is connected rotationally fixedly and stationarily at the upper end to the third profile part 23.

The profile tube 2 is connected to the center, second telescope part 22 as follows. An adapter part 24, which is mounted stationarily and rotationally fixedly on the lower side facing the first profile part 21, is provided in the interior of the telescope part 22. The mounting is done by means of pegs or pins, for example, which project from the outer side of the telescope part 22 through the wall and engage with the adapter part 24. The pegs or pins have a head 41 for example, which simultaneously functions as a sliding element as described above. A connecting element 30, which has snap elements 31 that are retained in projections 25 of the adapter part 24, is mounted rotationally fixedly and stationarily on the profile tube 2. The profile tube 2 is thus mounted stationarily fixedly and rotatably in the second telescope part 22 or in the adapter part 24. Due to the shape of the snap elements 31, the linear drive 1 can be introduced from above in the drawing into the telescope housing and guided through the adapter part, the snap elements 31 being elastically deformed or compressed during the passage. Fixation in the illustrated manner takes place automatically as soon as the snap elements 31 are underneath the projections 25. Accordingly no tools are necessary for the assembly of linear drive 1 in the telescopic housing 20, at least in the area of the center telescope part 22. A secure and reliable connection between the linear drive 1 and the telescopic housing 20 is nevertheless guaranteed.

Figure 2:
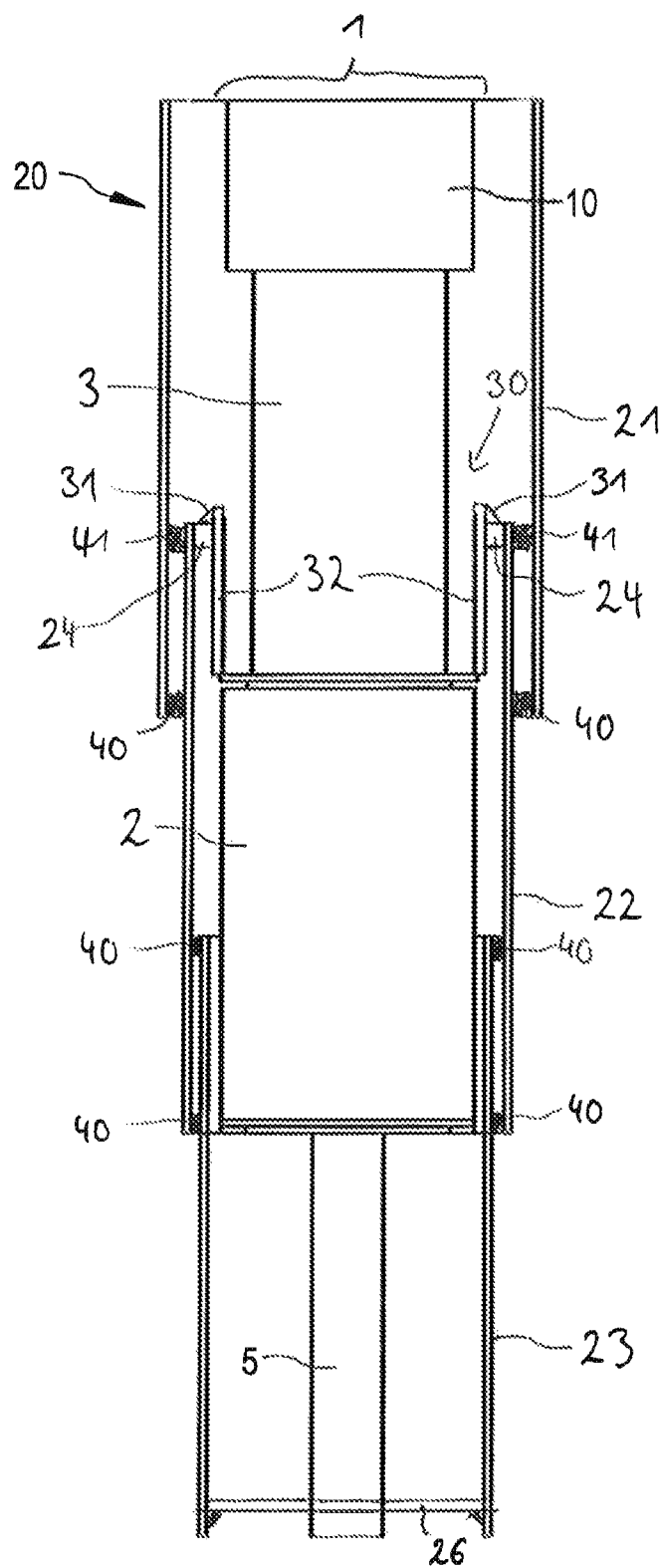
FIG. 2 shows another embodiment of the linear actuator.

FIG. 2 shows an alternative embodiment of a linear actuator in which a spindle-based linear drive 1 and a telescopic housing 20 are likewise provided. Differing from the embodiment in FIG. 1, the orientation of the telescope parts 21, 22, 23 is reversed in FIG. 2, so that the telescope part 21 with the largest diameter is arranged at the top relative to the drawing and the telescope part with the smallest diameter 23 is arranged at the bottom. The linear drive 1 corresponds substantially to the embodiment described in FIG. 1.

On the side facing the first telescope part 21, the second telescope part 22 again has an adapter part 24, which has a central opening through which projects a connecting element 30 with snap elements 31. In this embodiment, the connecting element 30 has an additional extension element 32 that surrounds the threaded hollow spindle 3 so that the axial movement of the threaded spindle is not hindered.

The adapter part 24 is again mounted via pins or bolts through the outer wall of the second telescope part 22, for example, heads 41 of the bolts or pins functioning as sliding elements between the telescope parts 21, 22.

The reader is referred to the description of FIG. 1 with respect to the additional elements in the embodiment of FIG. 2.

In the installation of the linear actuator, the linear drive 1 is again pushed through the lower telescope part 23 and the center telescope part 22 into the upper telescope part 21, and guided through the central opening of the adapter part 24, the snap elements 31 being compressed during the passage. After the passage, the snap elements 31 engage with the adapter part 24, so that a stationary connection between profile tube 2 and telescope part 22 is guaranteed. In this embodiment as well, assembly without using tools is possible, particularly in the area of the second telescope part 22.

Figure 3:
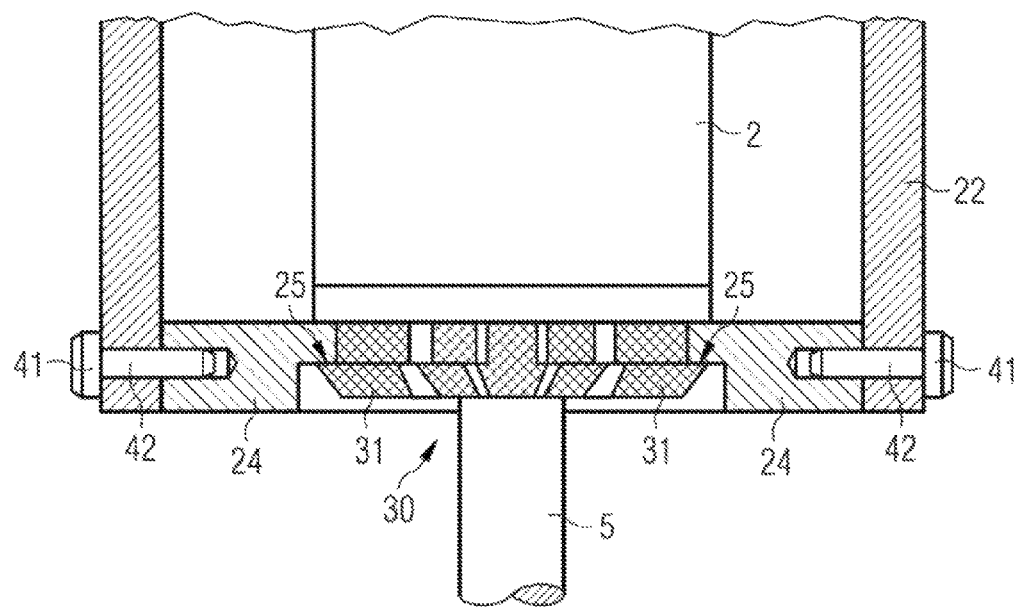
FIG. 3 shows a detailed view of one embodiment of a linear actuator.

FIG. 3 shows an example configuration of a detail of the linear actuator in the area of the connection between the profile tube 2 and the center telescope part 22. It can be clearly recognized here that the adapter part 24 is mounted laterally by means of pins 42 in the outer wall of the telescope part 22. The pins 42 engage in corresponding holes or recesses of the adapter part 24 and thus ensure a rotationally fixed and stationary connection. The pins 42 have the previously described heads 41, which can act as sliding elements. The heads are produced of plastic, for example, or have a plastic component or are covered with plastic in order to improve the sliding properties. It is likewise possible for the entire pin 42 along with the head 41 to be produced from plastic, for example polyoxymethylene, also known as POM.

The adapter part 24 has projections 25 that allow the snap elements 31 to engage. Accordingly, a movement of the profile tube 2 with the connecting element 30 is only possible from top to bottom in the representation of the drawing, whereas a movement from the bottom to the top is prevented.

Figure 4:
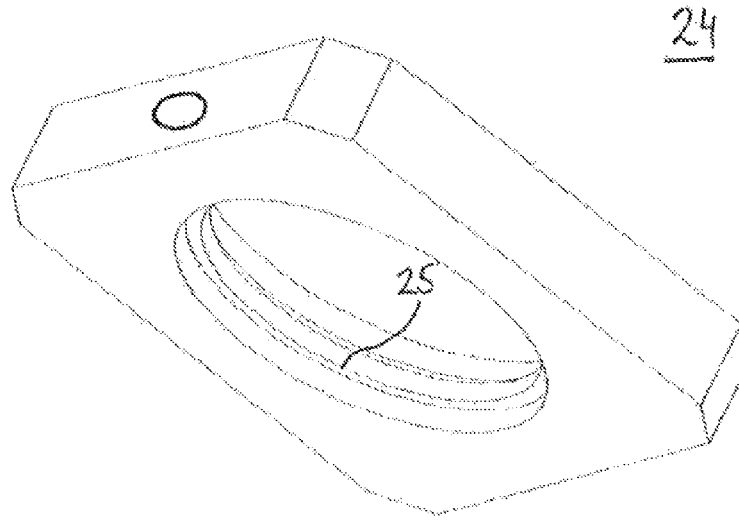
FIG. 4 shows an embodiment of an adapter part.

FIG. 4 shows an embodiment example of an adapter part 24, with a central circular opening, for a polygonal telescope part. In addition, a hole or a recess in which one of the pins 42 can engage is shown on the outer side of the adapter part 24. A projection 25 that enables interlocking with the snap elements 31 of the connecting element 30 is provided in the center of the central opening. Because the projection 25 is provided centrally, the installation direction of the adapter part 24 can also be interchanged, differing from the previously illustrated embodiments. It may also be pointed out that the design of the adapter part 24 can be matched as desired to the geometries of the telescope housing or the linear drive 1. In particular, the dimensions of the central opening in the interior of the adapter part 24 are matched for a given type of linear drive to a corresponding connecting element 30, for example, while the outer dimensions at the periphery of the adapter part 24 can be adapted to the geometry of the telescope housing or of the telescope part 22. Thereby the linear actuator overall can be designed flexibly.

In principle, the linear drive 1 can be designed in any manner desired. However, a specific example of such a linear drive 1 will be described below.

Figure 5:
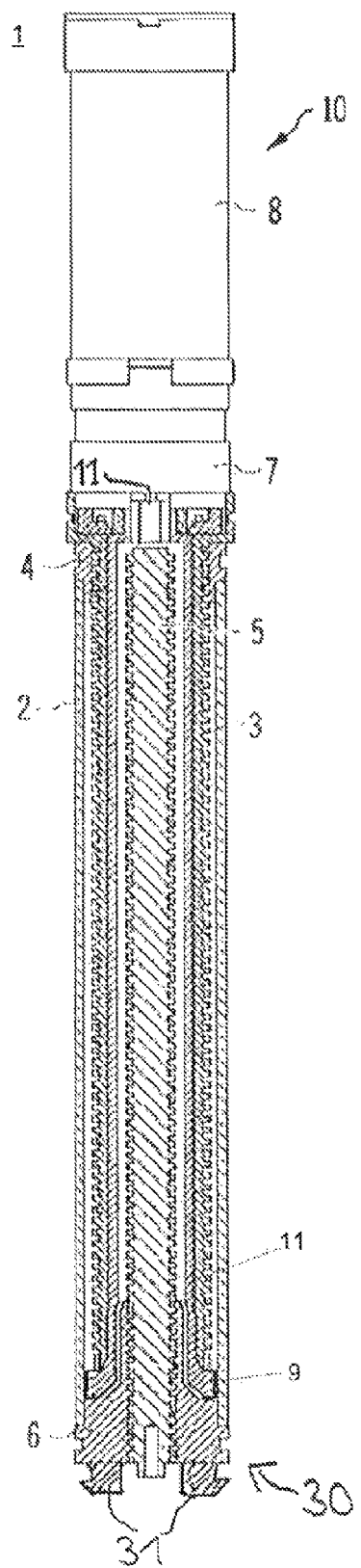
FIG. 5 shows an embodiment of a linear drive.

FIG. 5 shows an embodiment of a linear drive 1 in which a motor 8 and a gear unit 7 are arranged in a two-part drive unit housing 10, together forming a drive unit for a spindle system. Among other things, the spindle system comprises a drive shaft 11, which is driven by the motor 8 or the gear unit 7. The drive shaft 11 is internally hollow and extends longitudinally inside the profile tube 2 to which the drive shaft 11 is attached on its outer side rotationally fixedly and displaceable longitudinally by connection 9. The spindle system further comprises the threaded hollow spindle 3 with an outside thread, which is arranged between the drive shaft 11 and the profile tube 2 and is fixedly connected to the drive unit housing 10. A hollow spindle nut 4 is fixedly connected to the profile tube 2 at the upper end thereof and cooperates with the outside thread of the threaded hollow spindle 3. A spindle nut 6 is fixedly connected to the profile tube 2 at the lower end of the profile tube 2. The threaded spindle 5, which cooperates with a thread of the spindle nut 6, is arranged in the interior of the drive shaft 11. The outside thread of the threaded hollow spindle 3 and the thread of the threaded spindle 5 have opposite directions.

The drive unit housing 10 in the present embodiment comprises a motor housing and a gear unit housing. Alternatively, the motor 8 and the gear unit 7 can be arranged in a common drive unit housing 10.

When the linear drive is operated, the drive shaft 11 is driven by the drive unit 7, 8. Due to the rotationally fixed connection 9 of the drive shaft 11 to the profile tube 2, the latter rotates as well. Accordingly, the hollow spindle nut 4 rotates on the threaded hollow spindle 3 and converts the rotational movement of the profile tube 2 into a longitudinal movement. This longitudinal movement is possible due to the longitudinally displaceable mounting of the profile tube 2 on the drive shaft 11.

The spindle nut 6 also rotates along with the profile tube 2, so that the thread of the spindle nut 6 cooperates with the thread of the threaded spindle 5. This again results in a longitudinal movement of the threaded spindle 5 relative to the profile tube 2.

Thus an appropriate rotation of the drive shaft 11 results overall in a uniform, telescope-like relative movement between the drive shaft 11 or the threaded hollow spindle 3, the profile tube 2 and the threaded spindle 5, wherein the profile tube 2, as the largest-diameter element, is arranged centrally in the telescope-like arrangement.

At its lower end, the spindle nut 6 bears the connecting element 30 with the snap elements 31, which can create the connection to the adapter part in the second telescope part 22. The spindle nut 6 is preferably constructed integrally with the connecting element 30, preferably using a plastic such as POM.

Figure 6:
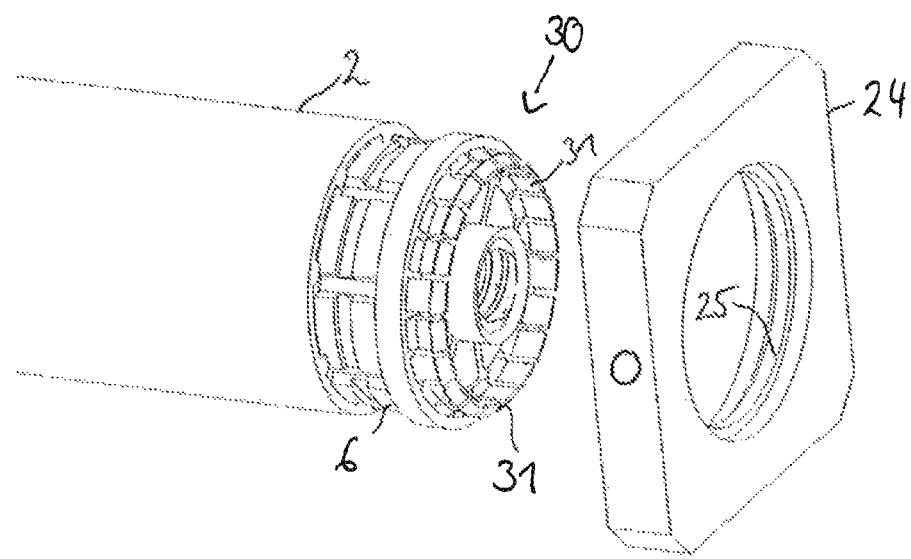
FIG. 6 shows an additional detail view of an embodiment of the linear actuator.

A detailed view of the profile tube 2 with the spindle nut 6 and an adapter part 24 is shown as an exploded view in FIG. 6. The spindle nut 6 in this case has an area that is received in the interior of the profile tube 2 and pressed together with it to achieve a rotationally fixed connection. On its outer side, the spindle nut 6 has the connecting element 30 with the snap elements 31, which run all around in this embodiment. The snap elements 31 can then come into engagement with the projection 25 of the adapter part 24, which allows rotation of the spindle nut 6 within adapter part 24.

Figure 7:
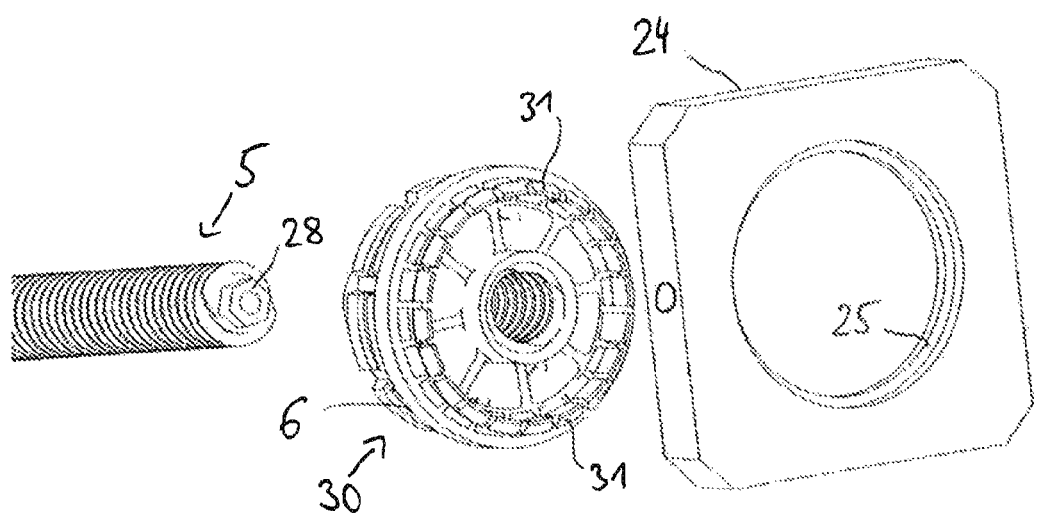
FIG. 7 shows an additional detail view of an embodiment of the linear actuator.

It can be recognized from FIG. 6, and even more clearly from FIG. 7, that the spindle nut 6 has an inside thread that can receive the threaded spindle 5. In this regard, FIG. 7 shows an exploded view of a detail with threaded spindle 5, spindle nut 6 and adapter part 24. On its end, the threaded spindle 5 has a hexagonal profile 28. In other embodiments, a different, polygonal or notched shape can be provided at the end of the threaded spindle 5, for example milled onto the end of the threaded spindle 5.

Figure 8:
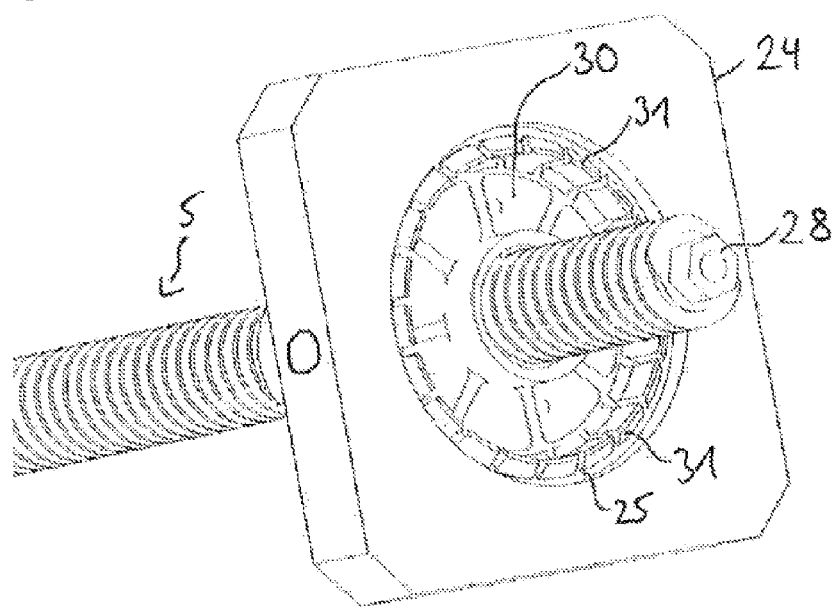
FIG. 8 shows an additional detail view of an embodiment of the linear actuator.

FIG. 8 shows the elements from FIG. 7 in the assembled state. It is recognizable in particular that the snap elements 31 here are engaged with the projection 25 of the adapter part 24.

Figure 9:
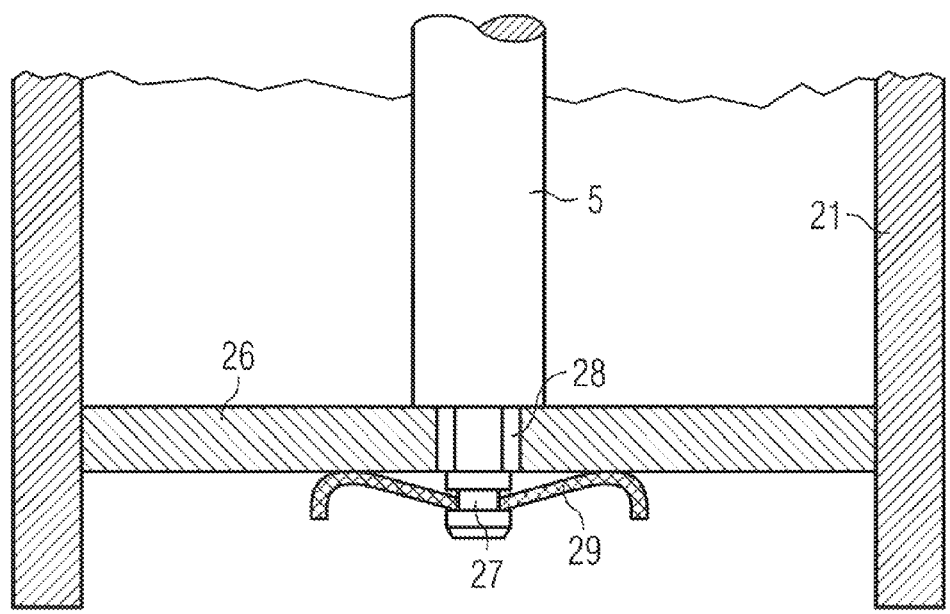
FIG. 9 shows an additional detail view of an embodiment of the linear actuator.

FIG. 9 shows another detailed view of an embodiment of the linear actuator, in which the connection of the threaded spindle 5 to the base part 26 of the first telescope part 21 can be seen in particular. In the installation of the linear drive 1 in the telescope housing 20, the linear drive 1 is introduced as described above into the telescopic housing. In particular, the hexagonal profile 28 at the end of the threaded spindle 5 is introduced into a corresponding polygonal opening in the base plate 26, so that a rotationally fixed connection between the threaded spindle 5 and the base plate 26 is produced. In the embodiment shown, the threaded spindle 5 has an extended projection 27, which extends from the threaded spindle 5 through the base plate 26. For axial securing, i.e. securing in the longitudinal direction, a fixation washer 29 is provided on the projection 27 to prevent the threaded spindle 5 from being pulled out of the base plate 26. For example, a so-called starlock washer can be used as a connecting washer 29.

Differing from the illustrated hexagonal profile 28, the profile can also have a different polygonal shape and/or a toothed or notched shape, which is matched in particular to the shape of a cutout in the base plate 26. This produces a form-fitting connection between the threaded spindle 5 and the base plate 26 or the telescope part 21.

For the connection shown in FIG. 9, it is also possible to install the linear drive in the telescopic housing without tools. In particular, the lock washer 29 can be applied without tools to the projection 27 of the threaded spindle 5.

Instead of a form-fit connection between the threaded spindle 5 and the base plate 26, a force-fit connection can also be created. For this purpose, the end of the threaded spindle 5 can have a conical shape that engages with a corresponding conical-shaped recess or conical-shaped hole in the base plate 26. The threaded spindle 5 is then secured to the base plate 26, via a screw for example, so that the conical profile is pulled tightly into the corresponding recess.

Not only can the use of tools be dispensed with in the above-described embodiments, it is also possible to omit cumbersome connecting means such as screws, gluing, rivets or the like. As previously described, even the fixation of the adapter part 24 in the telescope part 22 can be accomplished merely by inserting the securing pins from the outside. The securing pins are held and protected from falling out by the first telescope part, which encloses the second telescope part with the securing pins. If the linear drive must be exchanged or serviced, this is also possible with a comparatively minor effort in comparison to conventional solutions. Thus the connection to the base plate can be loosened with little effort and it is also possible to guide the snap elements through the adapter part by targeted compression in order to release the snap connection. Complete dismantling of the telescope housing can be dispensed with.

The telescopic housing 20 can be completely assembled and adjusted, particularly with respect to the sliding elements between the telescope parts, before insertion of the linear drive. In particular, a suitable adapter part is installed in the pre-assembly of telescope housing 20.

The invention claimed is:

1. A linear actuator comprising:
   a spindle-based linear drive that has an inner threaded spindle and an outer element surrounding the threaded spindle, in which the threaded spindle can be moved in the axial direction; and
   a telescopic housing with a first telescope part and a second telescope part, which is surrounded at least in part by the first telescope part, the first telescope part and the second telescope part each having a first base side and a second base side,
   wherein the first base side of the second telescope part faces the second base side of the first telescope part;
   wherein on its first base side, the second telescope part has an adapter part that is connected rotationally fixedly to the second telescope part and has a central opening, and
   wherein the linear drive has a connecting element that is mounted on the outer element and comprises snap elements that are engaged with the central opening of the adapter part in such a manner that the connecting element, with the snap elements, is held rotatably in the adapter part.

2. The linear actuator according to claim 1, wherein the snap elements are designed to allow a guidance of the connecting element through the central opening of the adapter part in one direction and to prevent guidance of the connecting element in an opposite direction.

3. The linear actuator according to claim 1 or 2, wherein the outer element is supported via the connecting element rotatably and stationarily in the adapter part.

4. The linear actuator according to claim 1, wherein the connecting element is formed from an elastically deformable plastic.

5. The linear actuator according to claim 1, wherein the snap elements are resiliently seated on the connecting element.

6. The linear actuator according to claim 1, wherein, on its first base side, the first telescope part has a base plate in which the threaded spindle is seated rotationally fixedly and stationarily.

7. The linear actuator according to claim 1, wherein the second telescope part with the adapter part is constructed in at least two parts.

8. The linear actuator according to claim 1, wherein the outer element is connected rotationally fixedly to the connecting element and, with the engagement of the snap elements with the central opening of the adapter part, the outer element is held rotatably in the adapter part.

9. The linear actuator according to claim 1, wherein the snap elements are engaged with the central opening of the adapter part in such a manner that the connecting element, with the snap elements, is secured against movement in the axial direction.

10. The linear actuator according to claim 1, wherein the adapter part is arranged in the second telescope part and is connected to the second telescope part via at least two pins introduced from an outer side.

11. The linear actuator according to claim 10, wherein the pins on the outer side of the second telescope part have a head that is in contact with an inner side of the first telescope part.

12. The linear actuator according to claim 1, wherein:
   the telescopic housing has a third telescope part, which is surrounded at least in part by the second telescope part;
   the linear drive is constructed in at least three parts and has a stationary drive unit housing; and
   the drive unit housing is connected rotationally fixedly and stationarily to the third telescope part.

13. The linear actuator according to claim 12, wherein the linear drive comprises:
   the drive unit housing with a drive unit arranged therein;
   a drive shaft that is driven by the drive unit and is internally hollow;
   a profile tube forming the outer element that is mounted rotationally fixedly and displaceable longitudinally on an outer side of the drive shaft;
   a threaded hollow spindle with an outside thread, wherein the threaded hollow spindle is arranged between the drive shaft and the profile tube and is fixedly connected to the drive unit housing;
   a hollow spindle nut that is fixedly connected at a first end of the profile tube to the profile tube and cooperates with the outside thread of the threaded hollow spindle;
   a spindle nut that is fixedly connected to the profile tube at a second end of the profile tube; and
   the inner threaded spindle, which is arranged in an interior of the drive shaft and cooperates with a thread of the spindle nut.

14. The linear actuator according to claim 13, wherein the spindle nut and the connecting element are constructed as a common component.

15. A linear actuator comprising:
   a spindle-based linear drive that has an inner threaded spindle and an outer element surrounding the threaded spindle, in which the threaded spindle can be moved in the axial direction; and
   a telescopic housing with a first telescope part, with a second telescope part, which is surrounded at least in part by the first telescope part, and with a third telescope part, which is surrounded at least in part by the second telescope part, the first telescope part, the second telescope part and the third telescope part each having a first base side and a second base side,
   wherein the first base side of the second telescope part faces the second base side of the first telescope part;
   wherein on its first base side, the second telescope part has an adapter part that is connected rotationally fixedly to the second telescope part and has a central opening,
   wherein the linear drive is constructed in at least three parts and has a stationary drive unit housing with a drive unit arranged therein,
   wherein the linear drive has a connecting element that is mounted on the outer element and comprises snap elements that are engaged with the central opening of the adapter part in such a manner that the connecting element is held in the adapter part, and
   wherein the linear drive comprises:
      the drive unit housing with a drive unit arranged therein;
      a drive shaft that is driven by the drive unit and is internally hollow;
      a profile tube forming the outer element that is mounted rotationally fixedly and displaceable longitudinally on an outer side of the drive shaft;
      a threaded hollow spindle with an outside thread, wherein the threaded hollow spindle is arranged between the drive shaft and the profile tube and is fixedly connected to the drive unit housing;
      a hollow spindle nut that is fixedly connected at a first end of the profile tube to the profile tube and cooperates with the outside thread of the threaded hollow spindle;

a spindle nut that is fixedly connected to the profile tube at a second end of the profile tube; and the inner threaded spindle, which is arranged in an interior of the drive shaft and cooperates with a thread of the spindle nut.

16. The linear actuator according to claim 15, wherein the spindle nut and the connecting element are constructed as a common component.

* * * * *